(12) United States Patent
Asai et al.

(10) Patent No.: US 10,940,768 B2
(45) Date of Patent: Mar. 9, 2021

(54) MAIN RELAY PROTECTION DEVICE (71) Applicant: SUBARU CORPORATION, Tokyo (JP)

(72) Inventors: Hiroto Asai, Tokyo (JP); Yo Masuda, Tokyo (JP); Takanobu Nishikori, Tokyo (JP); Kohei Takei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 107 days.

(21) Appl. No.: 16/431,249

(22) Filed: Jun. 4, 2019

(65) Prior Publication Data
US 2020/0094701 A1 Mar. 26, 2020

(30) Foreign Application Priority Data

Sep. 26, 2018 (JP) .............................. JP2018-180044
Sep. 26, 2018 (JP) .............................. JP2018-180068

(51) Int. Cl.
B60L 53/60 (2019.01)
H02J 7/02 (2016.01)
B60L 53/14 (2019.01)
B60K 6/28 (2007.10)
B60K 6/26 (2007.10)

(52) U.S. Cl.
CPC ............... B60L 53/60 (2019.02); B60L 53/14 (2019.02); H02J 7/027 (2013.01); B60K 6/26 (2013.01); B60K 6/28 (2013.01); B60Y 2200/92 (2013.01); B60Y 2300/91 (2013.01)

(58) Field of Classification Search
CPC .......... B60L 53/60; B60L 53/10; B60L 53/66; B60L 53/63; B60L 53/67; B60L 53/68
USPC ........................................................ 307/10.1
See application file for complete search history.

(56) References Cited

U.S. PATENT DOCUMENTS

2013/0127413 A1* 5/2013 Ohtomo .................... B60L 7/14
320/109

FOREIGN PATENT DOCUMENTS

JP 2012-196007 A 10/2012

* cited by examiner

*Primary Examiner* — Metasebia T Retebo
(74) *Attorney, Agent, or Firm* — McGinn IP Law Group, PLLC (57) ABSTRACT

A main relay protection device includes a motor generator, a rechargeable driving battery, an externally-coupled charger, a main relay, a charging bus bar, a charging relay, a main relay temperature sensor, and a controller. The motor generator drives a vehicle. The battery supplies power to the motor generator. The charger charges the battery. The main bus bar is disposed between the battery and the motor generator. The main relay is disposed in the main bus bar. The charging bus bar is disposed between the main bus bar and the charger. The charging relay is disposed in the charging bus bar. The sensor is configured to detect a temperature of the main relay. The controller performs ON-control on the charging relay in a state where the main relay is turned on, if the detected temperature of the main relay is higher than or equal to a preset heat radiation starting threshold.

17 Claims, 8 Drawing Sheets

MAIN RELAY PROTECTION DEVICE

CROSS-REFERENCE TO RELATED APPLICATIONS

The present application claims priority from Japanese Patent Application No. 2018-180044 filed on Sep. 26, 2018, and Japanese Patent Application No. 2018-180068 filed on Sep. 26, 2018, the entire contents of which are hereby incorporated by reference.

BACKGROUND

The disclosure relates to main relay protection devices and, in particular, to a device configured to protect a main relay disposed between a vehicle driving motor generator and a driving battery.

Motor-driven vehicles, which include hybrid vehicles, are equipped with vehicle driving motor generators. To drive a vehicle is a function of a motor (an electric motor) of a motor generator. In most cases, a motor-driven vehicle uses a motor generator as a generator (a power generator) used to recover power and thus, such a motor generator is herein referred to as a vehicle driving motor generator. Typically, the vehicle driving motor generator is supplied with power from a driving battery used to drive a vehicle and recovered power is stored in the driving battery. Typically, a main relay (a system main relay) is disposed between the motor generator and the driving battery. The main relay is configured to electrically couple or interrupt the motor generator and the driving battery.

A motor generator used to drive a vehicle typically has high-voltage and large-current characteristics so as to generate sufficient driving force for example. Accordingly, a driving battery used to supply power to the motor generator also has high-voltage and large-capacity characteristics. Techniques of coupling the driving battery to an external power source for charging during a halt of a vehicle have been receiving attention for example. Among the hybrid vehicles, vehicles employing such techniques are particularly called plug-in hybrid vehicles, which are becoming widespread. A so-called electric vehicle (EV), which is equipped simply with a motor generator as a vehicle driving source, is based on the premise that the driving battery is configured to be coupled to an external power source to be charged.

Such a motor-driven vehicle with a driving battery configured to be coupled to an external power source to be charged is equipped with a charger using an external coupling scheme, which is hereinafter referred to as an externally-coupled charger and is constituted with an alternating-current-direct-current (AC-DC) converter or a DC-DC converter for example. A charging relay used to electrically couple or interrupt the externally-coupled charger and the driving battery is disposed between the driving battery and the externally-coupled charger, for example, further toward the driving battery than the main relay. The charging relay and the main relay are often accommodated in, for example, an identical housing, which is called a junction box. As a wiring member in the housing, a bus bar is used that is small in electrical resistance, excellent in heat radiation, and accordingly, capable of allowing large current to flow. That is, the charging relay is disposed in a charging bus bar between a main bus bar, which is between the driving battery and the motor generator, and the externally-coupled charger.

An example of such motor-driven vehicles is the plug-in hybrid vehicle discussed in Japanese Unexamined Patent Application Publication (JP-A) No. 2012-196007, which is described below. In the motor-driven vehicle, during a halt of the system and charging through coupling to an external power source, a temperature rise of the main relay is controlled so that an exciting current of the main relay has a predetermined current value that is smaller than the current value at the time of the start-up of the system and is capable of contact holding between a fixed contact and a movable contact. After that, electrical coupling of the circuit by bringing the fixed contact and the movable contact of the relay into contact is activated and electrical interruption of the circuit by bringing the fixed contact and the movable contact of the relay into non-contact is inactivated. If a system is started to drive a motor-driven vehicle equipped with a charging relay, which is the above-described motor-driven vehicle for example, the charging relay is turned off.

SUMMARY

An aspect of the disclosure provides a main relay protection device including a motor generator, a rechargeable driving battery, an externally-coupled charger, a main bus bar, a main relay, a charging bus bar, a charging relay, a main relay temperature sensor, and a controller. The motor generator is configured to drive a vehicle. The rechargeable driving battery is configured to supply power to the motor generator. The externally-coupled charger is configured to charge the driving battery. The a main bus bar is disposed between the driving battery and the motor generator The main relay is disposed in the main bus bar. The charging bus bar is disposed between the main bus bar and the externally-coupled charger. The charging relay is disposed in the charging bus bar. The main relay temperature sensor is configured to detect a temperature of the main relay. The controller is configured to perform ON-control on the charging relay in a state where the main relay is turned on if the temperature of the main relay detected in the main relay temperature sensor is higher than or equal to a preset heat radiation starting threshold.

An aspect of the disclosure provides a main relay protection device including a motor generator, a rechargeable driving battery, an externally-coupled charger, a main bus bar, a main relay, a charging bus bar, a charging relay, a main relay temperature sensor, and circuitry. The motor generator is configured to drive a vehicle. The rechargeable driving battery is configured to supply power to the motor generator. The externally-coupled charger is configured to charge the driving battery. The a main bus bar is disposed between the driving battery and the motor generator The main relay is disposed in the main bus bar. The charging bus bar is disposed between the main bus bar and the externally-coupled charger. The charging relay is disposed in the charging bus bar. The main relay temperature sensor is configured to detect a temperature of the main relay. The circuitry is configured to perform ON-control on the charging relay in a state where the main relay is turned on if the temperature of the main relay detected in the main relay temperature sensor is higher than or equal to a preset heat radiation starting threshold.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

As in JP-A No. 2012-196007 described above for example, in a motor-driven vehicle equipped with a motor generator and a driving battery, a main relay is normally turned on at start-up of a system. A contact of the main relay has electrical resistance and power between the driving battery and the motor generator exhibits high voltage and large current. Accordingly, the temperature of the main relay turned on rises. If the main relay enters an overheating state, a problem of fusing of a contact can be caused. Thus, in conventional measures taken so as to lower the temperature of a main relay, the temperature of the main relay is monitored and if the temperature of the main relay becomes higher than or equal to a predetermined temperature used to avoid fusing, for example, a limitation is imposed on power from the driving battery, or if the vehicle is a hybrid vehicle for example, the ratio of engine driving force is increased, that is, power from the driving battery to be used is decreased.

However, this main relay cooling method can involve problems that if power from the driving battery is limited, acceleration or deceleration of the vehicle may fail to be achieved as desired by the driver, or that if the ratio of engine driving force is increased in a hybrid vehicle, fuel efficiency may decrease and the amount of exhaust gas may increase. Since a motor-driven vehicle with a driving battery that is configured to be coupled to an external power source to be charged is becoming widespread, a main relay protection device is widely demanded that can prevent overheating of a main relay with reliability in a motor-driven vehicle equipped with an externally-coupled charger and a charging relay.

It is desirable to provide a main relay protection device that can prevent overheating of a main relay with reliability in a motor-driven vehicle equipped with an externally-coupled charger and a charging relay.

Figure 1:
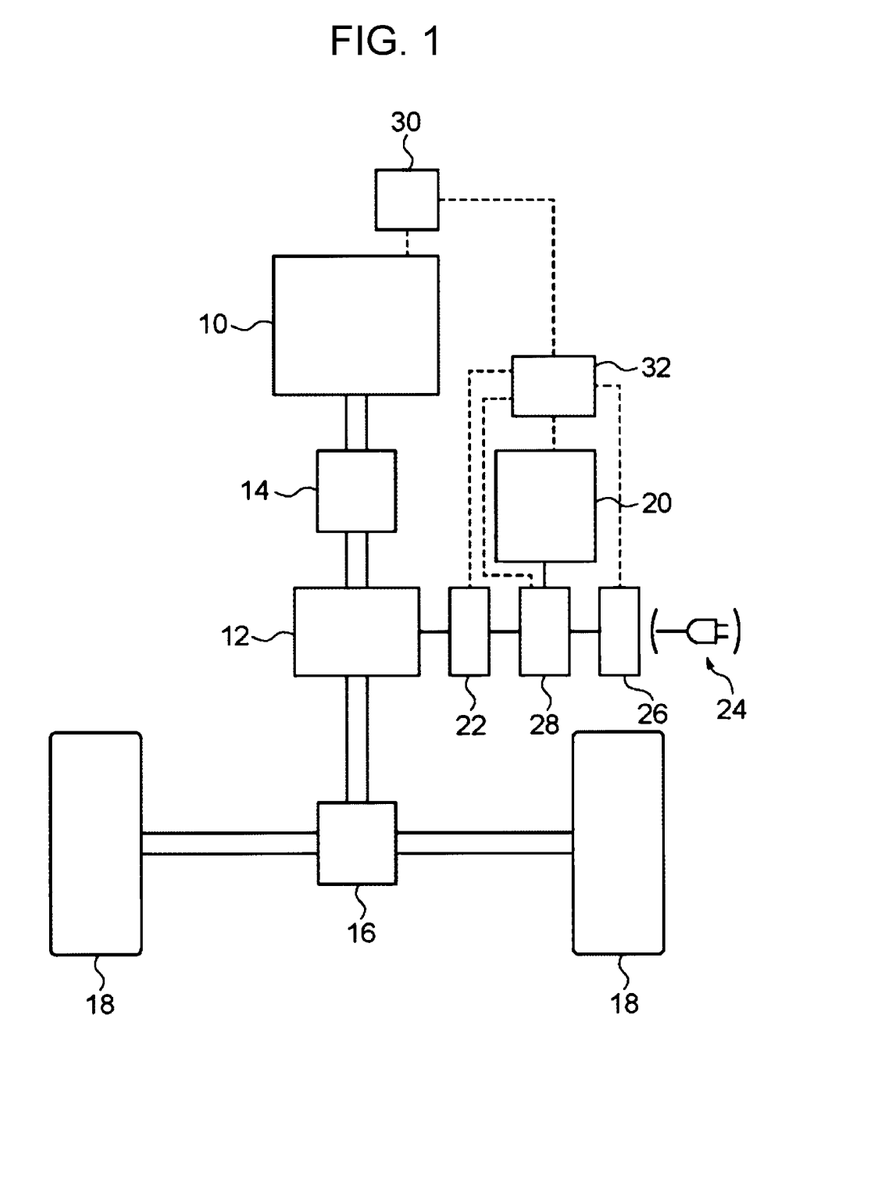
FIG. 1 is a schematic structural diagram illustrating an embodiment of a hybrid vehicle to which a main relay protection device according to the disclosure is applied.

A first embodiment of the main relay protection device according to the disclosure is described in detail below with reference to the drawings. FIG. 1 is a schematic structural diagram of a motor-driven vehicle to which the main relay protection device according to the first embodiment is applied. The motor-driven vehicle is a plug-in hybrid vehicle and FIG. 1 schematically illustrates a power train of the plug-in hybrid vehicle. Similar to an already-existing plug-in hybrid vehicle, the plug-in hybrid vehicle is equipped with both an engine 10 and a motor generator 12 that are used to drive the vehicle. A coupling device 14 couples the engine 10 and the motor generator 12, and the combined driving force thereof is transferred to driving wheels 18 via a differential device 16. A clutch mechanism is used as the coupling device 14 for example. For another example, a planetary pinion mechanism can also be used as the coupling device 14. In that case, the engine 10 is coupled to one of the elements that constitute the planetary pinion mechanism and the motor generator 12 is coupled to another one of the elements while an unillustrated individual motor generator is coupled to the other element. The driving wheels 18 may be four wheels.

A driving system of the motor generator 12 includes a driving battery 20 and a driving circuit 22, such as an inverter. The driving battery 20 is configured to supply power to the motor generator 12 and store power recovered in the motor generator 12. The driving circuit 22 is configured to convert power from the driving battery 20 and supply the resultant power to the motor generator 12, and configured to convert power recovered in the motor generator 12 and cause the resultant power to be stored in the driving battery 20. Since the motor-driven vehicle in the first embodiment is a plug-in hybrid vehicle, an externally-coupled charger 26 and a junction box 28 are further included. The externally-coupled charger 26 is configured to cause the driving battery 20 to be charged with power from an external power source 24 that is coupled. The junction box 28 includes relays that are configured to electrically interrupt the externally-coupled charger 26 and the driving battery 20, and configured to electrically interrupt the driving battery 20 and the motor generator 12.

In the hybrid vehicle in the first embodiment, similar to vehicles used in recent years, the operational state of the engine 10 can be controlled in an engine control unit 30 and the operational state of the motor generator 12, such as power running operation or regenerative operation, can be controlled in a control unit 32. Collectively, a power control unit configured to control the entire driving force of the vehicle may be included. In addition, a battery control unit configured to control the driving battery 20 may be included. These control units each include, for example, a computer system as described later and have a high computing capability. In a typical hybrid vehicle (e.g. a plug-in hybrid vehicle), the engine 10 undergoes cooperative control with the motor generator 12.

Figure 2:
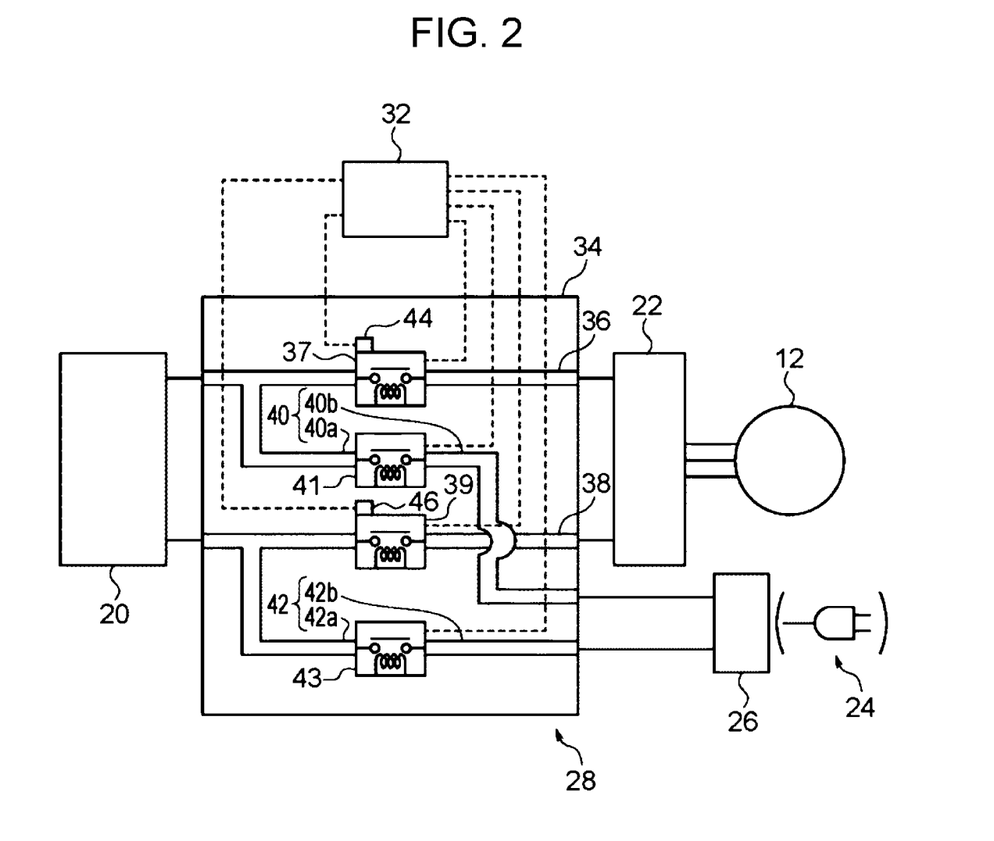
FIG. 2 is a block diagram illustrating a driving system of a motor generator in FIG. 1.

FIG. 2 is a block diagram illustrating the driving system of the motor generator 12 in FIG. 1. In a housing 34 of the junction box 28, bus bars are used as wiring members. As described above, a bus bar made of a metallic bar (a metallic board) is small in electrical resistance because of a large cross-sectional area in a current orthogonal direction and excellent in heat radiation because of its uncovered area. Accordingly, such a bus bar is suitable for passage of large current. In the first embodiment, a three-phase AC motor is used for the motor generator 12 while power of the driving battery 20 is DC power. Thus, the driving circuit 22 is configured to convert the DC power into three-phase AC power and supply the resultant power to the motor generator 12. When a regenerative operation of the motor generator 12 is performed, the opposite acts. Further, the externally-coupled charger 26 according to the first embodiment is configured to convert AC power of the external power source 24 into DC power and charge the driving battery 20 with the resultant power. Thus, the externally-coupled charger 26 includes an AC-DC converter or a DC-DC converter for example.

Thus, in the housing 34 of the junction box 28, a positive pole side main bus bar (hereinafter referred to as the positive main bus bar) 36 and a negative pole side main bus bar (hereinafter referred to as the negative main bus bar) 38 are provided. The positive main bus bar 36 is used to couple the positive pole of the driving battery 20 and the positive pole of the driving circuit 22. The negative main bus bar 38 is used to couple the negative pole of the driving battery 20 and the negative pole of the driving circuit 22. In addition, in the positive main bus bar 36, a positive pole side main relay (hereinafter referred to as the positive main relay) 37 used to electrically interrupt the positive pole of the driving battery 20 and the positive pole of the driving circuit 22, that is, the motor generator 12 is disposed. Further, in the negative main bus bar 38, a negative pole side main relay (hereinafter referred to as the negative main relay) 39 used to electrically interrupt the negative pole of the driving battery 20 and the negative pole of the driving circuit 22, that is, the motor generator 12 is disposed.

Moreover, in the housing 34 of the junction box 28, a positive pole side charging bus bar (hereinafter referred to as the positive charging bus bar) 40 and a negative pole side charging bus bar (hereinafter referred to as the negative charging bus bar) 42 are provided. The positive charging bus bar 40 is used to couple the positive main bus bar 36 and the positive pole of the externally-coupled charger 26 further toward the driving battery 20 than the positive main relay 37. The negative charging bus bar 42 is used to couple the negative main bus bar 38 and the negative pole of the externally-coupled charger 26 further toward the driving battery 20 than the negative main relay 39 described above. In addition, in the positive charging bus bar 40, a positive pole side charging relay (hereinafter referred to as the positive charging relay) 41 used to electrically interrupt the positive pole of the driving battery 20 and the positive pole of the externally-coupled charger 26 is disposed. Further, in the negative charging bus bar 42, a negative pole side charging relay (hereinafter referred to as the negative charging relay) 43 used to electrically interrupt the negative pole of the driving battery 20 and the negative pole of the externally-coupled charger 26 is disposed.

The positive main relay 37 is provided with a positive pole side main relay temperature sensor (hereinafter referred to as the positive main relay temperature sensor) 44 used to detect a positive main relay temperature $T_P$. Further, the negative main relay 39 is provided with a negative pole side main relay temperature sensor (hereinafter referred to as a negative main relay temperature sensor) 46 used to detect a negative main relay temperature $T_N$. The positive main relay temperature $T_P$ detected in the positive main relay temperature sensor 44 and the negative main relay temperature $T_N$ detected in the negative main relay temperature sensor 46 are read into the control unit 32. The positive main relay 37, the negative main relay 39, the positive charging relay 41, and the negative charging relay 43 are configured to undergo ON-OFF control by the control unit 32. The ON-OFF control of these relays may be performed by, for example, a power control unit configured to control the entire driving force of the vehicle.

Such control units as the control unit 32 and the engine control unit 30 each include a computer system, which is a microcomputer for example. Similar to a known computer system, this computer system includes a processor with an advanced computing function and additionally includes, for example, memory configured to store a program, and an input/output device configured to read a sensor signal or perform intercommunication with another control unit.

Figure 3:
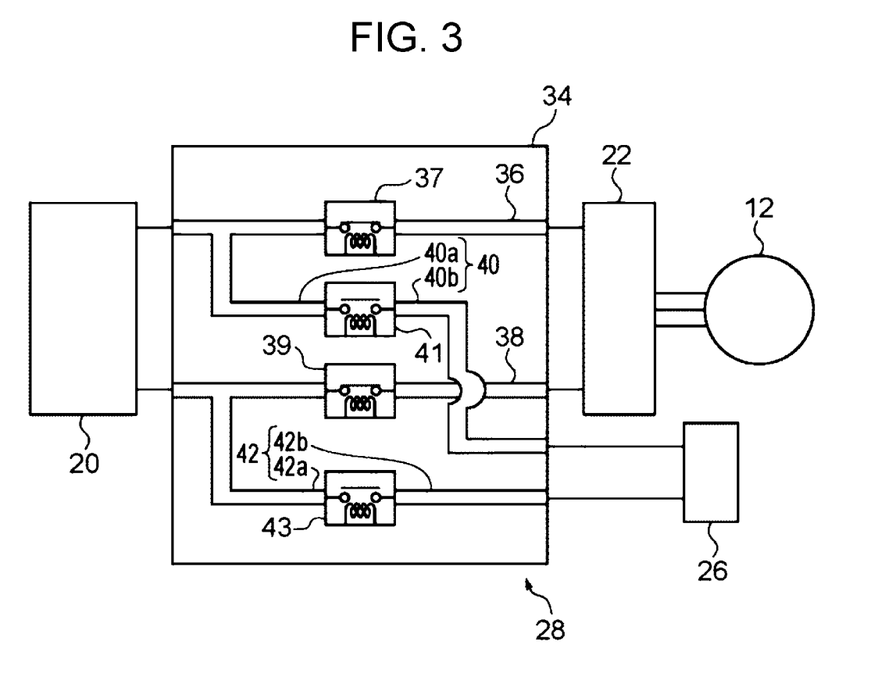
FIG. 3 is an explanatory diagram for a state of relays operating in FIG. 2.
Figure 4:
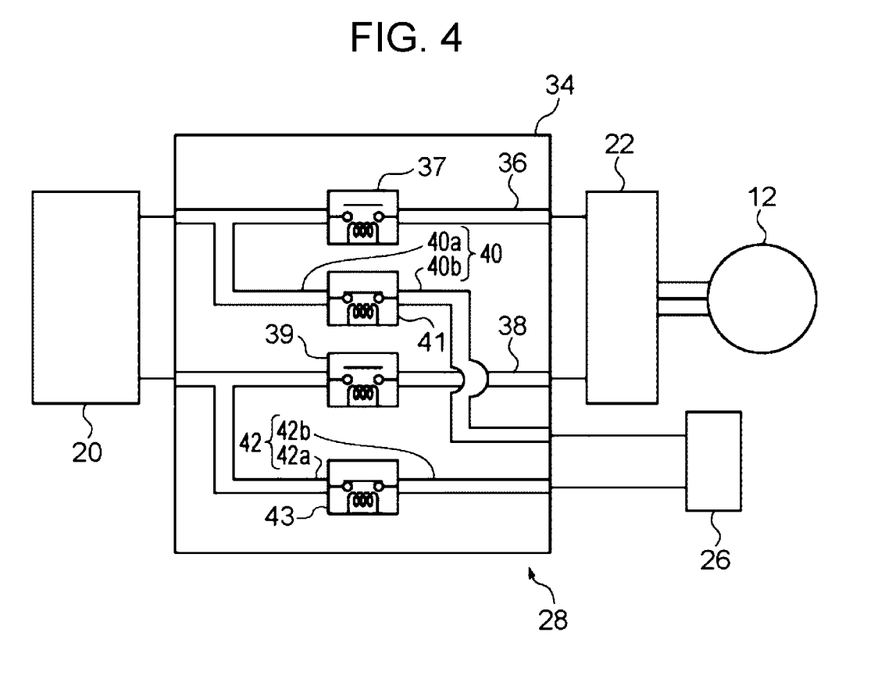
FIG. 4 is an explanatory diagram for the state of the relays operating in FIG. 2.

FIGS. 3 and 4 illustrate representative operations of the positive main relay 37, the negative main relay 39, the positive charging relay 41, and the negative charging relay 43 that are configured to undergo ON-OFF control by the control unit 32. FIG. 3 illustrates a state where the system as a vehicle is started, that is, a state where the vehicle is enabled to travel. In such a state of the system started, the positive main relay 37 and the negative main relay 39 are turned on while the positive charging relay 41 and the negative charging relay 43 are turned off. FIG. 4 illustrates a state where the system as a vehicle is halted and where the driving battery 20 is coupled to the external power source 24 and the driving battery 20 is charged via the externally-coupled charger 26. In such a state of being coupled to the external power source, the positive charging relay 41 and the negative charging relay 43 are turned on while the positive main relay 37 and the negative main relay 39 are turned off. As described in JP-A No. 2012-196007 mentioned above, if, in a state of being coupled to an external power source, for example, power of an unillustrated auxiliary battery is consumed so as to perform ON-control on the control unit 32 and each relay and if the driving battery 20 is used to compensate for the consumed power, the positive main relay 37 and the negative main relay 39 may undergo ON-control.

Figure 5:
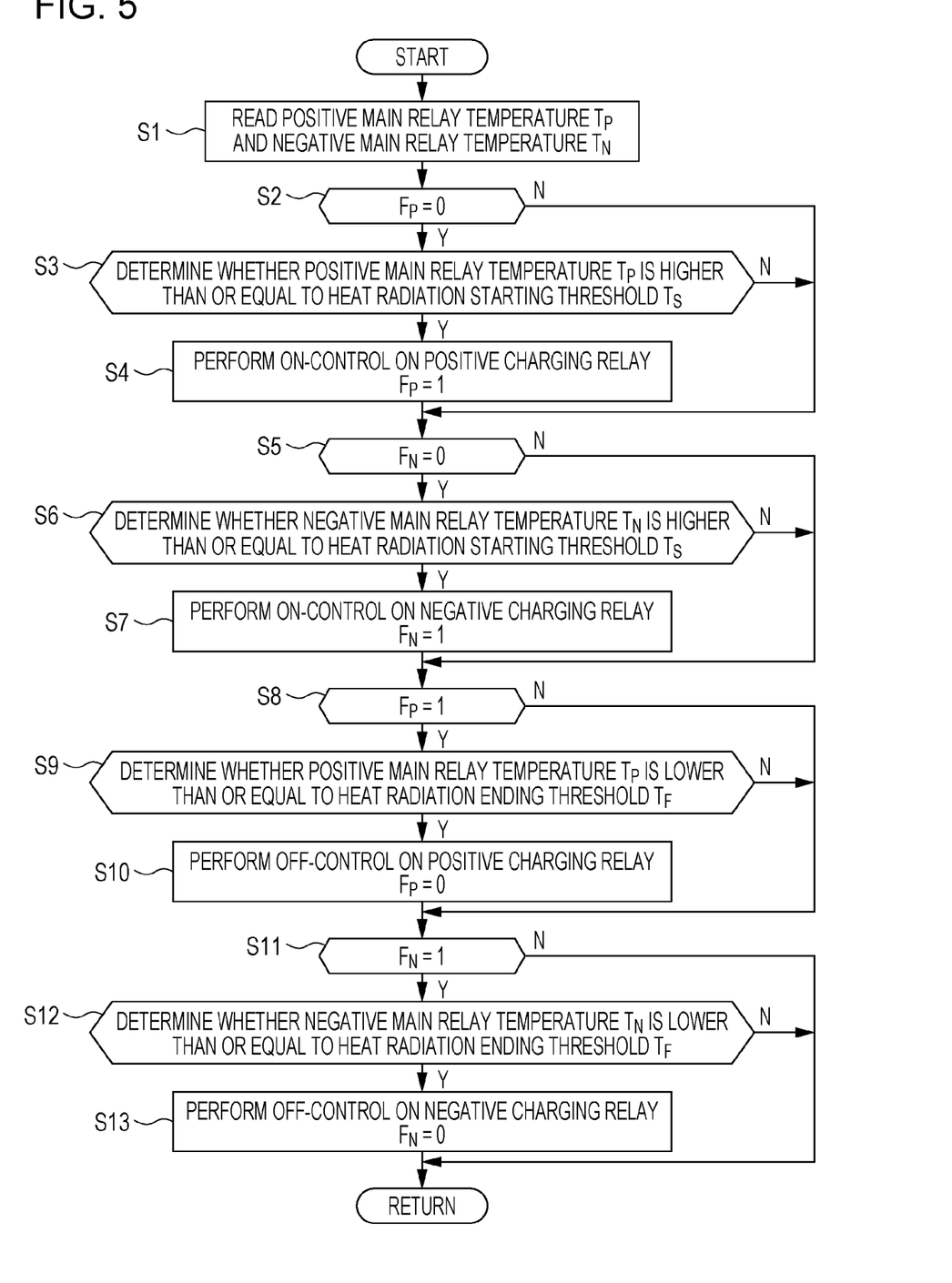
FIG. 5 is a flow chart of a computation process performed in a control unit in FIG. 1.

FIG. 5 is a flow chart of a computation process performed in the control unit 32 so as to prevent the positive main relay 37 and the negative main relay 39 from overheating. This computation process is, for example, a timer interruption process performed in a predetermined sampling period, where first in step S1, the positive main relay temperature $T_P$ and the negative main relay temperature $T_N$ detected in the positive main relay temperature sensor 44 and the negative main relay temperature sensor 46, respectively, are read.

Subsequently, the process proceeds to step S2 in which it is determined whether a positive main relay cooling flag $F_P$ is in a reset state, where the positive main relay cooling flag $F_P$ indicates 0. If the positive main relay cooling flag $F_P$ is in the reset state, the process proceeds to step S3. If not, the process proceeds to step S5.

In step S3, it is determined whether the positive main relay temperature $T_P$ read in step S1 is higher than or equal to a heat radiation starting threshold $T_S$ by which it is conceivable that heat radiation may be necessary. If the positive main relay temperature $T_P$ is higher than or equal to the heat radiation starting threshold $T_S$, the process proceeds to step S4. If not, the process proceeds to step S5.

In step S4, the positive charging relay 41 undergoes ON-control and the positive main relay cooling flag $F_P$ is brought into a set state, where the positive main relay cooling flag $F_P$ indicates 1. After that, the process proceeds to step S5.

In step S5, it is determined whether the negative main relay cooling flag $F_N$ is in a reset state, where the negative main relay cooling flag $F_N$ indicates 0. If the negative main relay cooling flag $F_N$ is in the reset state, the process proceeds to step S6. If not, the process proceeds to step S8.

In step S6, it is determined whether the negative main relay temperature $T_N$ read in step S1 is higher than or equal to the heat radiation starting threshold $T_S$. If the negative main relay temperature $T_N$ is higher than or equal to the heat radiation starting threshold $T_S$, the process proceeds to step S7. If not, the process proceeds to step S8.

In step S7, the negative charging relay 43 undergoes ON-control and the negative main relay cooling flag $F_N$ is brought into a set state, where the negative main relay cooling flag $F_N$ indicates 1. After that, the process proceeds to step S8.

In step S8, it is determined whether the positive main relay cooling flag $F_P$ is in the set state where the positive main relay cooling flag $F_P$ indicates 1. If the positive main relay cooling flag $F_P$ is in the set state, the process proceeds to step S9. If not, the process proceeds to step S11.

In step S9, it is determined whether the positive main relay temperature $T_P$ read in step S1 is lower than or equal to a heat radiation ending threshold $T_F$. If the positive main relay temperature $T_P$ is lower than or equal to the heat radiation ending threshold $T_F$, the process proceeds to step S10. If not, the process proceeds to step S11.

In step S10, the positive charging relay 41 undergoes OFF-control and the positive main relay cooling flag $F_P$ is brought into the reset state where the positive main relay cooling flag $F_P$ indicates 0. After that, the process proceeds to step S11.

In step S11, it is determined whether the negative main relay cooling flag $F_N$ is in the set state where the negative main relay cooling flag $F_N$ indicates 1. If the negative main relay cooling flag $F_N$ is in the set state, the process proceeds to step S12. If not, the process returns.

In step S12, it is determined whether the negative main relay temperature $T_N$ read in step S1 is lower than or equal to the heat radiation ending threshold $T_F$. If the negative main relay temperature $T_N$ is lower than or equal to the heat radiation ending threshold $T_F$, the process proceeds to step S13. If not, the process returns.

In step S13, the negative charging relay 43 undergoes OFF-control and the negative main relay cooling flag $F_N$ is brought into the reset state where the negative main relay cooling flag $F_N$ indicates 0. After that, the process returns.

According to the present computation process, if the positive main relay temperature $T_P$ of the positive main relay 37 is higher than or equal to the heat radiation starting threshold $T_S$, the positive charging relay 41 undergoes ON-control. If the positive main relay temperature $T_P$ is lower than or equal to the heat radiation ending threshold $T_F$, the positive charging relay 41 undergoes OFF-control. Further, if the negative main relay temperature $T_N$ of the negative main relay 39 is higher than or equal to the heat radiation starting threshold $T_S$, the negative charging relay 43 undergoes ON-control. If the negative main relay temperature $T_N$ is lower than or equal to the heat radiation ending threshold $T_F$, the negative charging relay 43 undergoes OFF-control.

Figure 6:
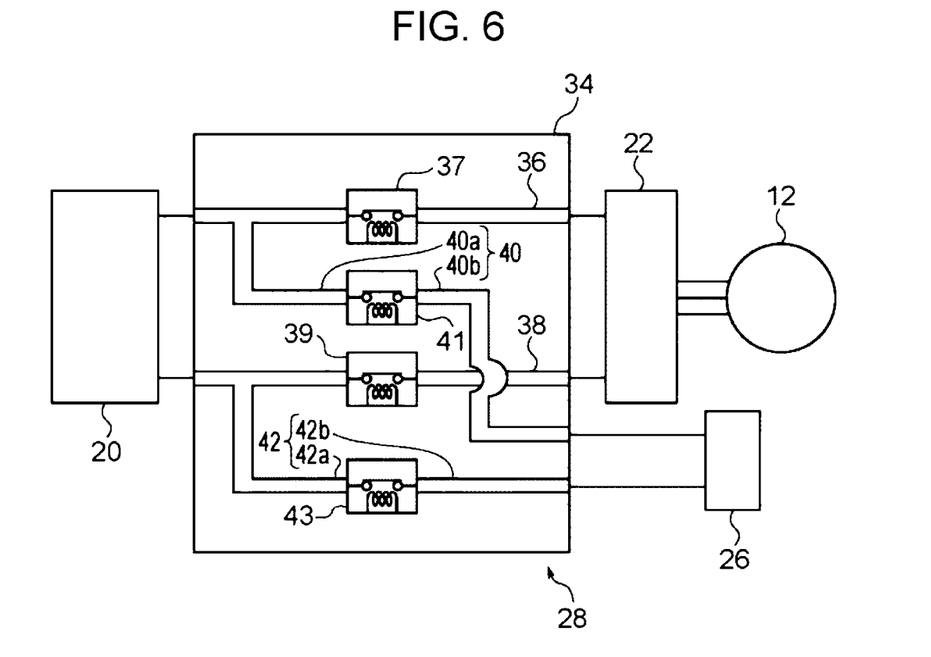
FIG. 6 is an explanatory diagram for the state of relays operating in FIG. 2 by the computation process in FIG. 5.

FIG. 6 illustrates a state where, by the computation process in FIG. 5, the positive charging relay 41 and the negative charging relay 43 undergo ON-control while the positive main relay 37 and the negative main relay 39 are turned on. In the first embodiment, the heat radiation starting threshold $T_S$ is set to 110° C. for example, and the heat radiation ending threshold $T_F$ is set to 100° C. for example. In other words, the positive charging relay 41 is turned on if the positive main relay temperature $T_P$ is between the heat radiation ending threshold $T_F$ and the heat radiation starting threshold $T_S$, and the negative charging relay 43 is turned on if the negative main relay temperature $T_N$ is between the heat radiation ending threshold $T_F$ and the heat radiation starting threshold $T_S$. Accordingly, the positive charging bus bar 40 and the negative charging bus bar 42 extend as heat radiation areas for the positive main relay 37 and the negative main relay 39 such that these main relays are cooled. The heat radiation starting threshold $T_S$ and the heat radiation ending threshold $T_F$ are set suitably.

As described above, contacts of the positive main relay 37 and the negative main relay 39 have electrical resistances. This means that although the remaining portions also have electrical resistance, the electrical resistances of the contacts are larger than those of the remaining portions. Thus, if the positive main relay 37 and the negative main relay 39 in the ON state are energized, Joule heat is caused at the contact portions thereof, and the positive main relay 37 and the negative main relay 39 rise in temperature. The inclination of the temperature rise becomes larger as the load of the motor generator 12 increases. In addition, if the temperature in the contact portions rises excessively, the contacts fuse together. In the first embodiment, it is desirable that the positive main relay temperature $T_P$ and the negative main relay temperature $T_N$ be each, for example, 100° C. or lower, which is desirably 90° C. or lower.

As described above, if the positive main relay temperature $T_P$ is higher than or equal to the heat radiation starting threshold $T_S$, the positive charging relay 41 undergoes ON-control. If the negative main relay temperature $T_N$ is higher than or equal to the heat radiation starting threshold $T_S$, the negative charging relay 43 undergoes ON-control. If the positive charging relay 41 is turned on, heat of the positive main relay 37 is transferred from the positive main bus bar 36 through a portion (hereinafter referred to as the battery-side portion) 40a, which is included in the positive charging bus bar 40 and located further toward the positive main bus bar 36 or, in other words, further toward the driving battery 20 than the positive charging relay 41, and then through (the contact of) the positive charging relay 41 to a portion (hereinafter referred to as the charger-side portion) 40b, which is included in the positive charging bus bar 40 and located further toward the externally-coupled charger 26 than the positive charging relay 41. Even if the temperature of the positive main relay 37 rises, in a state where the positive charging relay 41 is turned off, the charger-side portion 40b of the positive charging bus bar 40 is, for example, thermally separated from the positive main bus bar 36 and has a temperature that is, for example, as low as a room temperature inside the vehicle. If the charger-side portion 40b of the positive charging bus bar 40, which is cold, is coupled to the positive main bus bar 36, the heat of the positive main relay 37 is promptly transferred to the charger-side portion 40b of the positive charging bus bar 40. In addition, since the bus bar is excellent in heat radiation and has favorable heat transfer properties, the heat of the positive main relay 37 is promptly radiated and overheating itself can be prevented.

Similarly on the side of the negative pole, if the negative charging relay 43 is turned on, the heat of the negative main relay 39 is transferred from the negative main bus bar 38 through a portion (hereinafter referred to as the battery-side portion) 42a, which is included in the negative charging bus bar 42 and located further toward the negative main bus bar 38 or, in other words, further toward the driving battery 20 than the negative charging relay 43, and then through (the contact of) the negative charging relay 43 to a portion (hereinafter referred to as the charger-side portion) 42b, which is included in the negative charging bus bar 42 and located further toward the externally-coupled charger 26 than the negative charging relay 43. Even if the temperature of the negative main relay 39 rises, in a state where the negative charging relay 43 is turned off, the charger-side portion 42b of the negative charging bus bar 42 is, for example, thermally separated from the negative main bus bar 38 and has a temperature that is, for example, as low as a room temperature inside the vehicle. If the charger-side portion 42b of the negative charging bus bar 42, which is cold, is coupled to the negative main bus bar 38, the heat of the negative main relay 39 is promptly transferred to the charger-side portion 42b of the negative charging bus bar 42. As a result, the heat of the negative main relay 39 is promptly radiated and overheating itself can be prevented. Such heat radiation of the positive main relay 37 and the negative main relay 39 can bring an effect of, for example, a temperature drop of 1° C. or more per 10 seconds.

Figure 7:
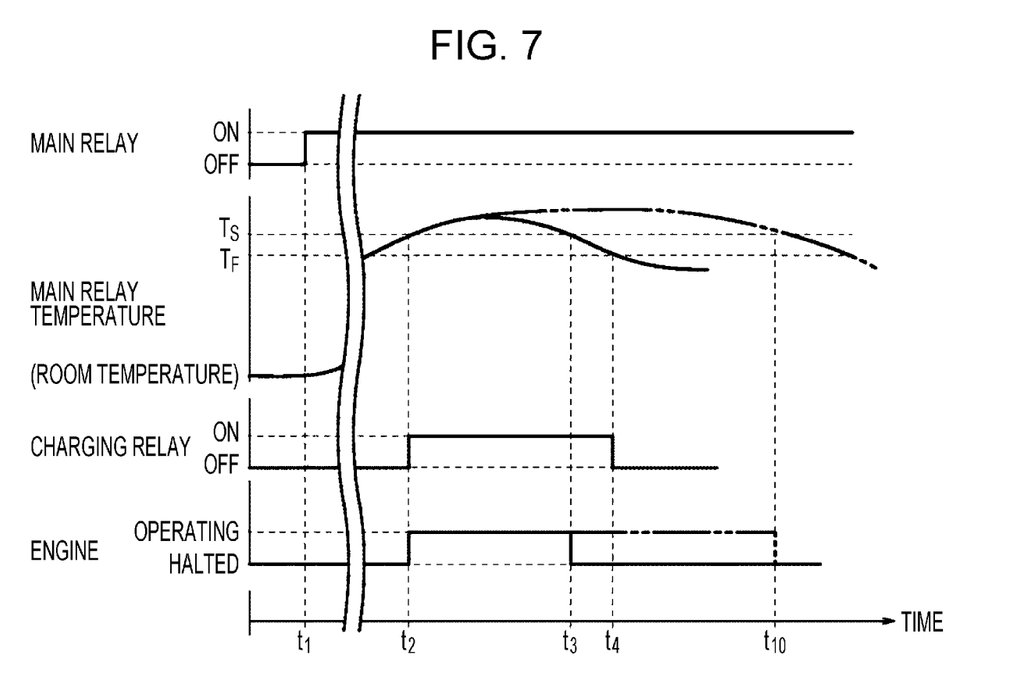
FIG. 7 is a timing chart illustrating the action of the computation process in FIG. 5.

FIG. 7 is a timing chart for describing the action of main relay heat radiation control by the computation process in FIG. 5. In the description of the present timing chart, for example, it is assumed that main relay protection control of a conventional hybrid vehicle (e.g. a plug-in hybrid vehicle) is performed, by which the engine 10 is forced to operate if the temperatures of the positive main relay 37 and the negative main relay 39 are higher than or equal to the heat radiation starting threshold $T_S$. By such control, current that can flow from the driving battery 20 to the positive main relay 37 and the negative main relay 39 can be reduced and accordingly, the temperatures of the positive main relay 37 and the negative main relay 39 can be lowered. It is assumed that, during the time indicated in the present timing chart, the vehicle can originally be driven simply by the driving force of the motor generator 12 and the engine 10 can be maintained in a halt state.

In the present timing chart, at time $t_1$, for example, an unillustrated start switch is turned on and accordingly, the system as a vehicle is started. As a result, the positive main relay 37 and the negative main relay 39 are turned on. With the travel of the vehicle after that, the temperatures of the positive main relay 37 and the negative main relay 39 rise. In the present timing chart, it is assumed that the temperatures of the positive main relay 37 and the negative main relay 39 vary equivalently, which are merely referred to as the main relay temperatures hereinafter. If no malfunction or abnormality is caused on the system, the temperatures of the positive main relay 37 and the negative main relay 39 vary approximately equivalently.

The main relay temperature that continues to rise even after that reaches and exceeds the heat radiation starting threshold $T_S$ at time $t_2$. Accordingly, the above-described engine forced-operation control is started, and the positive charging relay 41 and the negative charging relay 43 undergo ON-control. Thus, the rise in the main relay temperature is promptly eased and soon reaches the maximum value, and then begins to decrease. This main relay temperature reaches and falls below the heat radiation starting threshold $T_S$ at time $t_3$, which is after time $t_2$, and the above-described engine forced-operation control is ended. The main relay temperature that continues to drop even after that reaches and falls below the heat radiation ending threshold $T_F$ at time $t_4$, and the positive charging relay 41 and the negative charging relay 43 undergo OFF-control. Thus, in the main relay protection device according to the first embodiment, the above-described engine forced-operation control is ended at time $t_3$ after a relatively short length of time after time $t_2$.

In contrast, according to a conventional main relay protection method where lowering of the main relay temperature is attempted simply by the above-described engine forced-operation control without performing the charging relay ON-control using the computation process in FIG. 5, as indicated with the chain double-dashed line in FIG. 7, the main relay temperature continues to rise even after time $t_2$ and at time $t_{10}$, which comes after some time has elapsed from time $t_3$, reaches and falls below the heat radiation starting threshold $T_S$. At the timing, the engine forced-operation control is ended. Normally, if the engine 10 is forcibly operated when the vehicle can be driven simply with the driving force of the motor generator 12, the fuel efficiency decreases and the amount of exhaust gas increases in proportion to the length of the forced operation. Compared with the conventional main relay protection method, in which the engine forced-operation control takes a long time, the main relay protection device according to the first embodiment can largely shorten the time of the engine forced-operation control and can largely reduce problems such as decrease in fuel efficiency and increase in amount of exhaust gas.

As described above, in the main relay protection device according to the first embodiment, if the main relay temperature becomes higher than or equal to the heat radiation starting threshold $T_S$, the positive charging relay 41 and the negative charging relay 43 are turned on together with the positive main relay 37 and the negative main relay 39. Accordingly, the heat of the positive main relay 37 and the negative main relay 39 is transferred from the battery-side portion 40a of the positive charging bus bar 40 and the battery-side portion 42a of the negative charging bus bar 42 through the positive charging relay 41 and the negative charging relay 43 to the charger-side portion 40b of the positive pole charge bus bar 40 and the charger-side portion 42b of the negative charging bus bar 42, and the heat is radiated mainly from the charger-side portion 40b of the positive charging bus bar 40 and the charger-side portion 42b of the negative charging bus bar 42. Since the bus bar made of a metallic bar (a metallic board) is excellent in heat transfer and heat radiation, the heat of the positive main relay 37 and the negative main relay 39 is promptly radiated from the charger-side portion 40b of the positive charging bus bar 40 and the charger-side portion 42b of the negative charging bus bar 42. As a result, the positive main relay 37 and the negative main relay 39 are promptly cooled. Further, this configuration needs no extra device or structure. Thus, the main relay protection device according to the first embodiment makes it possible to prevent main relays of a motor-driven vehicle equipped with the externally-coupled charger 26 and charging relays from overheating with reliability.

Moreover, the positive main relay 37 and the negative main relay 39, and the positive charging relay 41 and the negative charging relay 43, which are accommodated in the housing 34 of the junction box 28, are disposed adjacent to each other. Accordingly, the positive main bus bar 36 and the negative main bus bar 38, and the positive charging bus bar 40 and the negative charging bus bar 42 are also disposed adjacent to each other. Thus, if the main relay temperature becomes higher than or equal to the heat radiation starting threshold $T_S$, the positive main relay 37 and the negative main relay 39 are promptly cooled and as a result, overheating of the main relays can be prevented with higher reliability.

In addition, the positive main relay 37 and the negative main relay 39, the positive charging relay 41 and the negative charging relay 43, the positive main bus bar 36 and the negative main bus bar 38, the positive charging bus bar 40 and the negative charging bus bar 42, and the positive main relay temperature sensor 44 and the negative main relay temperature sensor 46 are provided so as to correspond to the sides of the positive pole and negative pole of the driving battery 20, respectively, and the positive charging relay 41 and the negative charging relay 43 undergo ON-control according to the positive main relay temperature $T_P$ and the negative main relay temperature $T_N$, respectively. Thus, for example, even if the charger-side portion 40b of the positive charging bus bar 40 and the charger-side portion 42b of the negative charging bus bar 42 are different in heat radiation amount or thermal capacity, cooling control of the positive main relay 37 and the negative main relay 39 can be performed independently according to the positive main relay temperature $T_P$ and the negative main relay temperature $T_N$, respectively. As a result, overheating of the main relays can be prevented with higher reliability.

Although a coupling member used for a vehicle according to the first embodiment is described above, the disclosure is not limited to the configuration described in the first embodiment but may be changed variously within the scope of the gist of the disclosure. For example, in the first embodiment, the ON-OFF control of the main relays is performed on the positive pole side and the negative pole side of the driving battery, individually, and the ON-OFF control of the charging relays is also performed on the positive pole side and the negative pole side of the driving battery, individually. However, the ON-OFF control of these relays is not limited thereto. For example, the positive main relay and the negative main relay may undergo ON-OFF control at the same time, and in that case, the positive main relay and the negative main relay may solely be accommodated in an identical housing. Similarly, the positive charging relay and the negative charging relay may undergo ON-OFF control at the same time, and in that case, the positive charging relay and the negative charging relay may solely be accommodated in an identical housing.

Further, in the first embodiment, the heat radiation starting threshold $T_S$ and the heat radiation ending threshold $T_F$ different from each other are set for the ON-OFF control of the positive charging relay and the negative charging relay. However, as known, this is a hysteresis for preventing hunting of control and, for example, a single threshold may be used in performing the ON-OFF control.

Further, the ON-OFF control of a charging relay according to the first embodiment is similarly applicable to a so-called EV for example, which is equipped simply with a motor generator as a vehicle driving source. In that case, the engine forced-operation control in the timing chart in FIG. 7 may be replaced with, for example, power use restricting control of the driving battery. If the power use restricting control of the driving battery is performed in an EV, the motor generator may fail to exert the driving force that the driver demands. In such a case, sufficient acceleration or deceleration of the vehicle may fail to be achieved. In contrast, the main relay protection device according to the first embodiment that can shorten the time taken for the power use restricting control of the driving battery can easily achieve acceleration or deceleration of the vehicle as desired by the driver.

Further, the ON-OFF control of the charging relays 41 and 43 in the first embodiment may be performed solely during a halt of the vehicle for example. Thereby, electric characteristics between the driving battery 20 and the motor generator 12 and those between the main bus bars 36 and 38 and the externally-coupled charger 26 remain unchanged during a travel of the vehicle. As a result, malfunction of the system can be controlled with reliability.

A main relay protection device according to a second embodiment of the disclosure is described in detail below with reference to the drawings. Descriptions on configurations similar to those in the above-described first embodiment are omitted.

Figure 8:
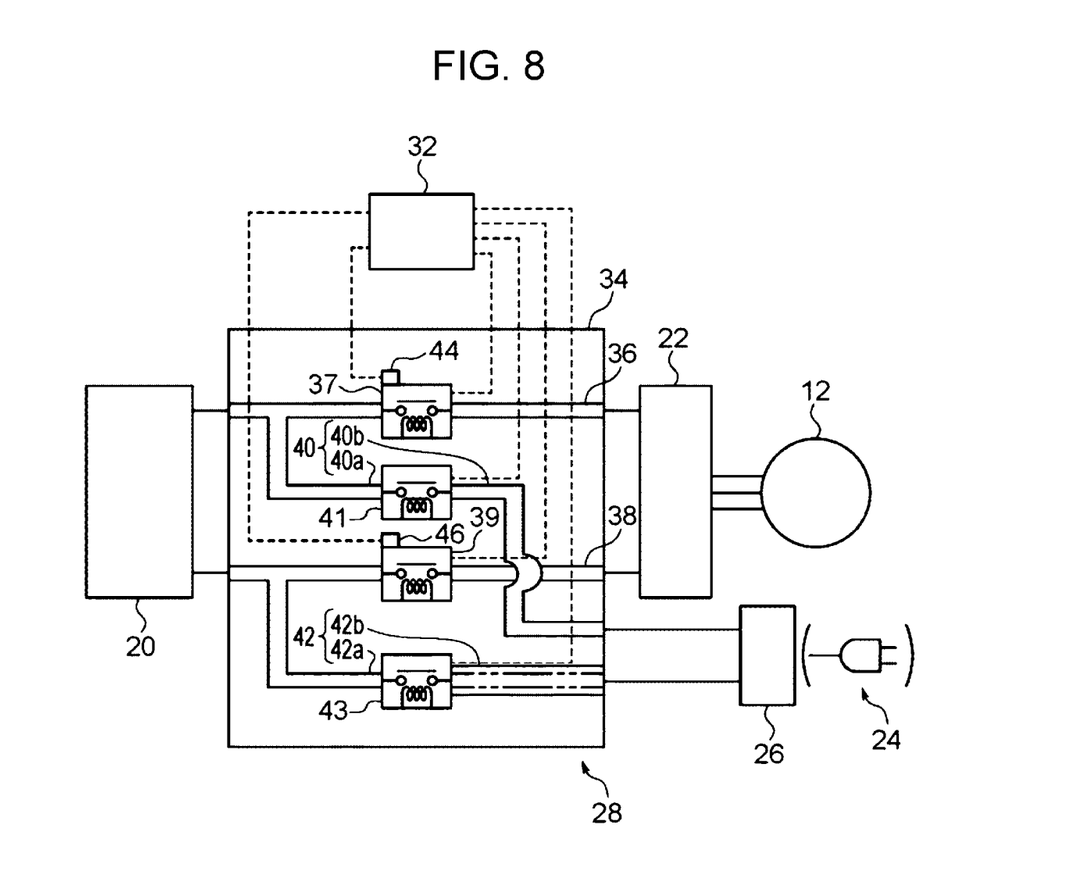
FIG. 8 is a block diagram illustrating a driving system of a motor generator according to a second embodiment of the disclosure.

In the second embodiment, at least one of the heat radiation amounts or thermal capacities of a charger-side portion 40b, which is included in a positive charging bus bar 40 and located further toward an externally-coupled charger 26 than a positive charging relay 41, and a charger-side portion 42b, which is included in a negative charging bus bar 42 and located further toward the externally-coupled charger 26 than a negative charging relay 43, are made approximately equivalent. Specifically, the heat radiation amount of a bus bar of an identical material is proportional to the surface area of the bus bar. Thus, to make the respective heat radiation amounts of the charger-side portion 40b of the positive charging bus bar 40 and the charger-side portion 42b of the negative charging bus bar 42 approximately equivalent, the respective surface areas of the positive charging bus bar 40 and the negative charging bus bar 42 are simply made approximately equivalent. The thermal capacity of a bus bar of an identical material is proportional to the mass of the bus bar. Thus, to make the respective thermal capacities of the charger-side portion 40b of the positive charging bus bar 40 and the charger-side portion 42b of the negative charging bus bar 42 approximately equivalent, the respective masses of the positive charging bus bar 40 and the negative charging bus bar 42 are simply made approximately equivalent. The former and latter conditions may be satisfied at the same time. In the second embodiment, as illustrated in FIG. 8, by increasing the width or thickness of the charger-side portion 42b of the negative charging bus bar 42, which is shorter than the charger-side portion 40b of the positive charging bus bar 40, both the heat radiation amounts and thermal capacities of the charger-side portions 40b and 42b are made equivalent. Further, in a control unit 32 according to the second embodiment, if a temperature difference $\Delta T$ between a positive main relay temperature $T_P$ detected in a positive main relay temperature sensor 44 and a negative main relay temperature $T_N$ detected in a negative main relay temperature sensor 46 becomes higher than or equal to a preset predetermined value, a system diagnosis is performed so as to determine that a malfunction or abnormality has occurred in the motor generator driving system.

Figure 9:
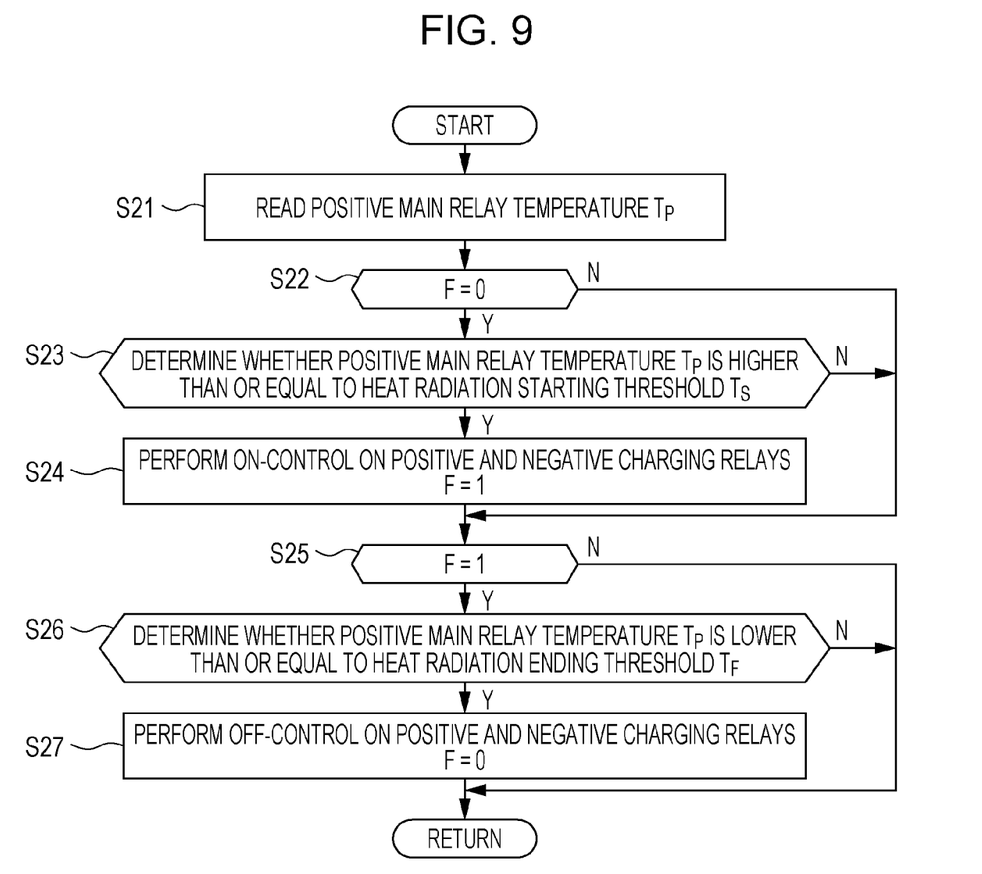
FIG. 9 is a flow chart of a computation process according to the second embodiment of the disclosure.

FIG. 9 is a flow chart of a computation process according to the second embodiment. This process is performed in the control unit 32. In the computation process described below, the positive charging relay 41 and the negative charging relay 43 undergo ON-OFF control at the same time according to the temperature of a positive main relay 37. However, for example, the control may be performed according to the temperature of a negative main relay 39 or according to an average temperature of the temperatures of the positive main relay 37 and the negative main relay 39. This computation process is, for example, a timer interruption process performed in a predetermined sampling period, and first in step S21, the positive main relay temperature $T_P$ detected in the positive main relay temperature sensor 44 is read.

Subsequently, the process proceeds to step S22 in which it is determined whether a main relay cooling flag F is in a reset state, where the main relay cooling flag F indicates 0. If the main relay cooling flag F is in the reset state, the process proceeds to step S23. If not, the process proceeds to step S25.

In step S23, it is determined whether the positive main relay temperature $T_P$ read in step S1 is higher than or equal to a heat radiation starting threshold $T_S$. If the positive main relay temperature $T_P$ is higher than or equal to the heat radiation starting threshold $T_S$, the process proceeds to step S24. If not, the process proceeds to step S25.

In step S24, the positive charging relay 41 and the negative charging relay 43 undergo ON-control at the same time and the main relay cooling flag F is brought into a set state, where the main relay cooling flag F indicates 1. After that, the process proceeds to step S25.

In step S25, it is determined whether the main relay cooling flag F is in the set state where the main relay cooling flag F indicates 1. If the main relay cooling flag F is in the set state, the process proceeds to step S26. If not, the process returns.

In step S26, it is determined whether the positive main relay temperature $T_P$ read in step S1 is lower than or equal to a heat radiation ending threshold $T_F$. If the positive main relay temperature $T_P$ is lower than or equal to the heat radiation ending threshold $T_F$, the process proceeds to step S27. If not, the process returns.

In step S27, the positive charging relay 41 and the negative charging relay 43 undergo OFF-control at the same time and the main relay cooling flag F is brought into the reset state where the main relay cooling flag F indicates 0. After that, the process returns.

According to the present computation process, if the positive main relay temperature $T_P$ of the positive main relay 37 is higher than or equal to the heat radiation starting threshold $T_S$, the positive charging relay 41 and the negative charging relay 43 undergo ON-control at the same time. If the positive main relay temperature $T_P$ is lower than or equal to the heat radiation ending threshold $T_F$, the positive charging relay 41 and the negative charging relay 43 undergo OFF-control at the same time. In the second embodiment, the heat radiation starting threshold $T_S$ is set to 110° C. for example, and the heat radiation ending threshold $T_F$ is set to 100° C. for example. That is, the positive charging relay 41 and the negative charging relay 43 are turned on at the same time if the positive main relay temperature $T_P$ is between the heat radiation ending threshold $T_F$ and the heat radiation starting threshold $T_S$. Accordingly, the positive charging bus bar 40 and the negative charging bus bar 42 extend as heat radiation areas for the positive main relay 37 and the negative main relay 39 such that these main relays are cooled. As a result, similar effects to those in the first embodiment can be obtained.

In addition, in the second embodiment, the heat radiation amounts and thermal capacities of the charger-side portion 40b of the positive charging bus bar 40 and the charger-side portion 42b of the negative charging bus bar 42 are made equivalent. Accordingly, if the temperatures of the positive main relay 37 and the negative main relay 39 are equivalent, the temperature rise characteristics of the charger-side portions 40b and 42b obtained when the positive main relay 37 and the negative main relay 39 with raised temperatures are coupled to the charger-side portions 40b and 42b, respectively, are equivalent to each other. Thus, the temperature drop characteristics of of the positive main relay 37 and the negative main relay 39 obtained in a state where the charger-side portions 40b and 42b are coupled are also equivalent, and the difference ΔT between the temperatures of the main relays 37 and 39 can be maintained as being small.

Figure 10:
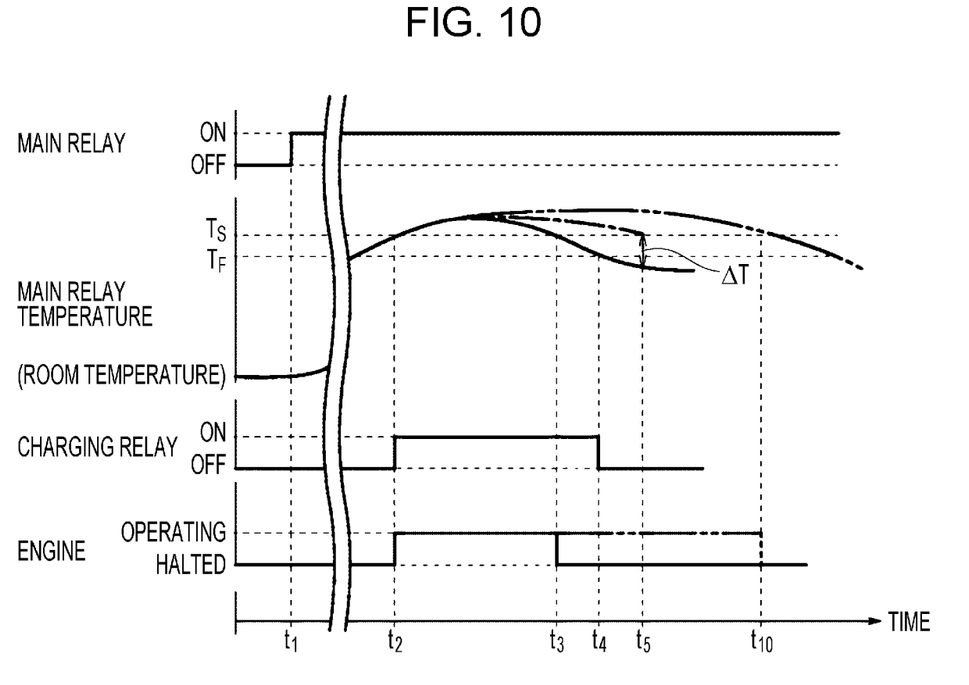
FIG. 10 is a timing chart illustrating the action of the computation process according to the second embodiment of the disclosure.

FIG. 10 is a timing chart for describing the action of main relay heat radiation control by the computation process in FIG. 9. If the width or thickness of the charger-side portion 42b of the negative charging bus bar 42 is equivalent to the width or thickness of the charger-side portion 40b of the positive charging bus bar 40, the thermal capacity or heat radiation amount of the charger-side portion 42b of the negative charging bus bar 42 is smaller than the thermal capacity or heat radiation amount of the charger-side portion 40b of the positive charging bus bar 40. Thus, the temperature drop characteristics, that is, the cooling characteristics per unit time of the negative main relay 39 to which the charger-side portion 42b of a virtual negative charging bus bar (indicated with the chain double-dashed line in FIG. 8) is coupled are smaller than the temperature drop characteristics of the positive main relay 37 to which the charger-side portion 40b of the positive charging bus bar 40 is coupled in terms of the absolute values of the temperature drops. In that case, as indicated with the alternate long and short dash line in FIG. 10, the temperature of the negative main relay 39 after the ON-control of the charging relay exhibits no abrupt drop and, as a result, the temperature difference ΔT between the temperatures of the positive main relay 37 and the negative main relay 39 reaches and exceeds the above-described predetermined value at time $t_5$. Accordingly, through the above-described system diagnosis, the motor generator driving system may be incorrectly determined as having caused a malfunction or abnormality.

In contrast, according to the second embodiment, the heat radiation amounts and thermal capacities of the charger-side portions 40b and 42b are approximately equivalent on the positive pole side and negative pole side of the driving battery 20. Thus, the temperature drop characteristics of the positive main relay 37 and the negative main relay 39 obtained through the charger-side portions 40b and 42b are approximately equivalent and accordingly, the difference ΔT between the temperatures of the positive main relay 37 and the negative main relay 39 is small. As a result, for example, even in the above-described system diagnosis based on the difference ΔT between the temperatures of the positive main relay 37 and the negative main relay 39, the motor generator driving system can be avoided from being incorrectly determined as having caused a malfunction or abnormality.

As described above, according to the disclosure, use of a simple configuration where a main relay and a charging relay are turned on at the same time if the temperature of the main relay is higher than or equal to a heat radiation starting threshold makes it possible to cool the main relay promptly. Thus, a main relay of a motor-driven vehicle equipped with an externally-coupled charger and a charging relay can be prevented from overheating with reliability, and problems such as failing to achieve desired acceleration or deceleration, decrease in fuel efficiency, increase in exhaust gas, and the like can be reduced.

The invention claimed is:

1. A main relay protection device comprising:
a motor generator configured to drive a vehicle;
a rechargeable driving battery configured to supply power to the motor generator;
an externally-coupled charger configured to charge the driving battery;
a main bus bar between the driving battery and the motor generator;
a main relay disposed in the main bus bar;
a charging bus bar disposed between the main bus bar and the externally-coupled charger;
a charging relay disposed in the charging bus bar;
a main relay temperature sensor configured to detect a temperature of the main relay; and
a controller configured to perform ON-control on the charging relay in a state where the main relay is turned on, in a case that the temperature of the main relay detected in the main relay temperature sensor is higher than or equal to a preset heat radiation starting threshold.

2. The main relay protection device according to claim 1, wherein
the main relay, the charging relay, the main bus bar, and the charging bus bar are accommodated in an identical housing.

3. The main relay protection device according to claim 1, wherein each a positive pole and a negative pole of the rechargeable driving battery is provided with the main relay, the charging relay, the main bus bar, the charging bus bar, and the main relay temperature sensor, and the controller performs the ON-control on the respective charging relays on the positive pole and the negative pole according to the temperatures respectively detected in the respective main relay temperature sensors on the positive poles and the negative poles.

4. The main relay protection device according to claim 2, wherein each a positive pole and a negative pole of the rechargeable driving battery is provided with the main relay, the charging relay, the main bus bar, the charging bus bar, and the main relay temperature sensor, and the controller performs the ON-control on the respective charging relays on the positive pole and the negative pole according to the temperatures respectively detected in the respective main relay temperature sensors on the positive poles and the negative poles.

5. The main relay protection device according to claim 1, wherein
the controller is configured to perform the ON-control on the charging relay during a halt of the vehicle.

6. The main relay protection device according to claim 2, wherein
the controller is configured to perform the ON-control on the charging relay during a halt of the vehicle.

7. The main relay protection device according to claim 3, wherein
the controller is configured to perform the ON-control on the charging relay during a halt of the vehicle.

8. The main relay protection device according to claim 4, wherein
the controller is configured to perform the ON-control on the charging relay during a halt of the vehicle.

9. The main relay protection device according to claim 1, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

10. The main relay protection device according to claim 2, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

11. The main relay protection device according to claim 3, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

12. The main relay protection device according to claim 4, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

13. The main relay protection device according to claim 5, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

14. The main relay protection device according to claim 6, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

15. The main relay protection device according to claim 7, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

16. The main relay protection device according to claim 8, wherein
at least one of a heat radiation amount or a thermal capacity is approximately equivalent between a first portion of the charging bus bar on a side of the positive pole and a second portion of the charging bus bar on a side of the negative pole, the charging bus bar on the side of the positive pole corresponding to the positive pole of the driving battery, the first portion being located further toward the externally-coupled charger than the charging relay, the charging bus bar on the side of the negative pole corresponding to the negative pole of the driving battery, the second portion being located further toward the externally-coupled charger than the charging relay.

17. A main relay protection device comprising:
a motor generator configured to drive a vehicle;
a rechargeable driving battery configured to supply power to the motor generator;
an externally-coupled charger configured to charge the driving battery;
a main bus bar between the driving battery and the motor generator;
a main relay disposed in the main bus bar;
a charging bus bar disposed between the main bus bar and the externally-coupled charger;
a charging relay disposed in the charging bus bar;
a main relay temperature sensor configured to detect a temperature of the main relay; and
circuitry configured to perform ON-control on the charging relay in a state where the main relay is turned on, in a case that the temperature of the main relay detected in the main relay temperature sensor is higher than or equal to a preset heat radiation starting threshold.

* * * * *